Oct. 8, 1957 H. S. FALL 2,809,085

ELECTRONIC ASSEMBLY CHASSIS SUPPORTING TRACK

Filed March 1, 1956 3 Sheets-Sheet 1

INVENTOR
HERBERT S. FALL
BY Herbert A. Minturn
ATTORNEY

Oct. 8, 1957 H. S. FALL 2,809,085

ELECTRONIC ASSEMBLY CHASSIS SUPPORTING TRACK

Filed March 1, 1956 3 Sheets-Sheet 2

INVENTOR ~
HERBERT S. FALL
BY ~ Herbert A. Minturn
ATTORNEY

ELECTRONIC ASSEMBLY CHASSIS SUPPORTING TRACK

Filed March 1, 1956 3 Sheets-Sheet 3

INVENTOR
HERBERT S. FALL
BY Herbert Q. Mintura
ATTORNEY 2,809,085

ELECTRONIC ASSEMBLY CHASSIS SUPPORTING TRACK

Herbert Scott Fall, Indianapolis, Ind.

Application March 1, 1956, Serial No. 568,810

1 Claim. (Cl. 312—323)

This invention has to do with means for supporting a chassis carrying an electronic assembly whereby the assembly may be interchangeably inserted within a cabinet, moved outwardly therefrom to a predetermined distance and secured in a position either in a fixed manner or in a rockable manner, and further including means whereby the chassis may be rocked upwardly or downwardly to make the tube side or the wiring side available for inspection and repair when necessary, including an inspection of the various units for usual maintenance.

It is a common matter to assemble various electronic circuits on chassis which may be fitted within a cabinet in tiers whereby each tier may be in effect a separate drawer to be pulled outwardly and pushed back inwardly within the cabinet.

In many cabinets, space is extremely limited particularly between the side walls, and the chassis naturally needs to be made as wide as possible for the particular cabinet since space externally of the cabinet is generally at a premium where these electronic installations are to be made. The cabinet form is preferred in order to present a systematic means for supporting the various devices, and also for safety as well as keeping dust and foreign matter out of the assembly. The invention relates particularly to a track, and in order to solve the various problems, this track needs to be made as thin as possible laterally or in a horizontal direction and yet has to be sufficiently strong to support loads up to as much as 175 pounds which at the present time is substantially a maximum load to be carried.

The structure of this track embodying the invention is supported in a cantilever manner so that there has to be considerable strength built into this structure, and such limitations impose quite a bit of ingenuity in order to accomplish the solution of the problem.

Not only is it a primary object of the invention to produce a thin track, but also this track must be extensible and retractible in order that it may carry the chassis outwardly from the cabinet to be entirely clear thereof so as to permit easy access on both sides of the chassis, particularly from its underside where most of the wiring, connections, condensers, and the like are mounted. To have access to that underside of the chassis, the invention also embodies means for retaining the chassis in various degrees of rocked positions from a minus 90 degree position and around over to approximately 105 degree position so that the underside of the chassis when in that 105 degree position is turned upwardly for ready access and observation of the underside thereof. It is of particular advantage to have the chassis rocked around forwardly and downwardly to give easy observation of the "tube" side particularly when the chassis is in one of the upper tiers above the line of vision over the front edge of the chassis front cover.

A still further important object of the invention is to provide a structure of the type indicated which will be easily operated, freely shiftable from the retracted to the extended positions and the reverse, and which will be extremely durable under hard usage over long periods of time.

These and many other objects and advantages of the invention will become apparent to those versed in the art in the following description of the invention as illustrated in the accompanying drawings, in which.

Figures 9, 10, 10A:
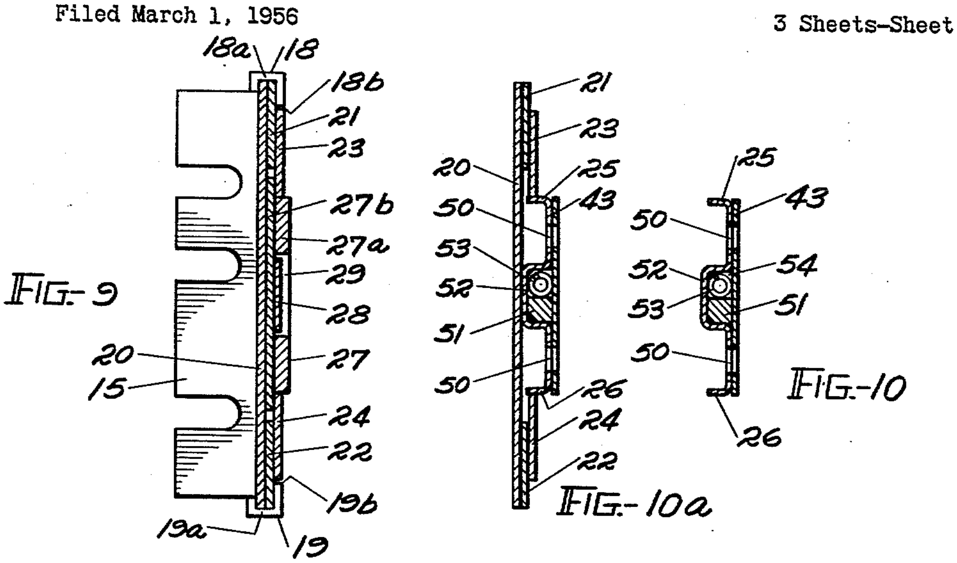
Fig. 9 is a view in vertical section on an enlarged scale on the line 9—9 in Fig. 2.
Fig. 10 is a view in vertical section on the line 10—10 in Fig. 2.

Fig. 10*a* is a view in vertical section similar to that in Fig. 10, with the parts shown in Fig. 10 retracted to within supports of the track proper.

Figure 11:
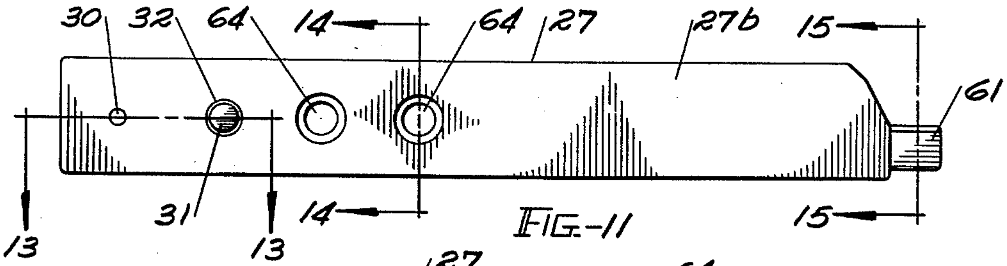
Figure 12:
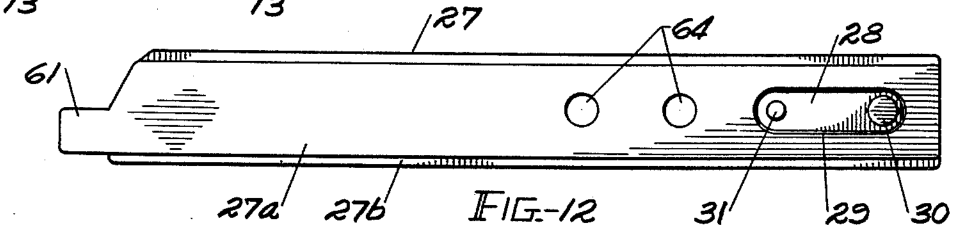
Figure 13:
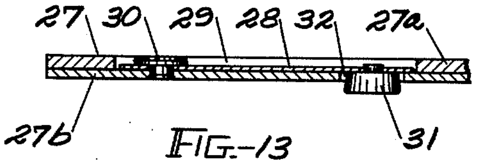
Figure 14:
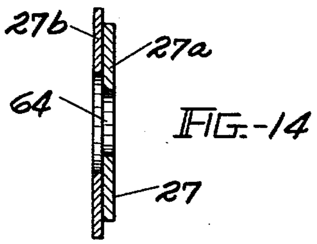
Figure 15:
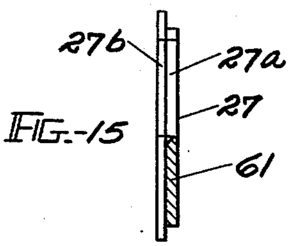

Fig. 11 is a view in outside elevation of a modified form of a track inner slide;

Fig. 12 is an inside view of the track inner slide;

Fig. 13 is a view in horizontal section on the line 13—13 in Fig. 11, on an enlarged scale;

Fig. 14 is a view in vertical section on the line 14—14 in Fig. 11, on an enlarged scale; and Fig. 15 is a vertical section on the line 15—15 in Fig. 11, on an enlarged scale.

Figure 1:
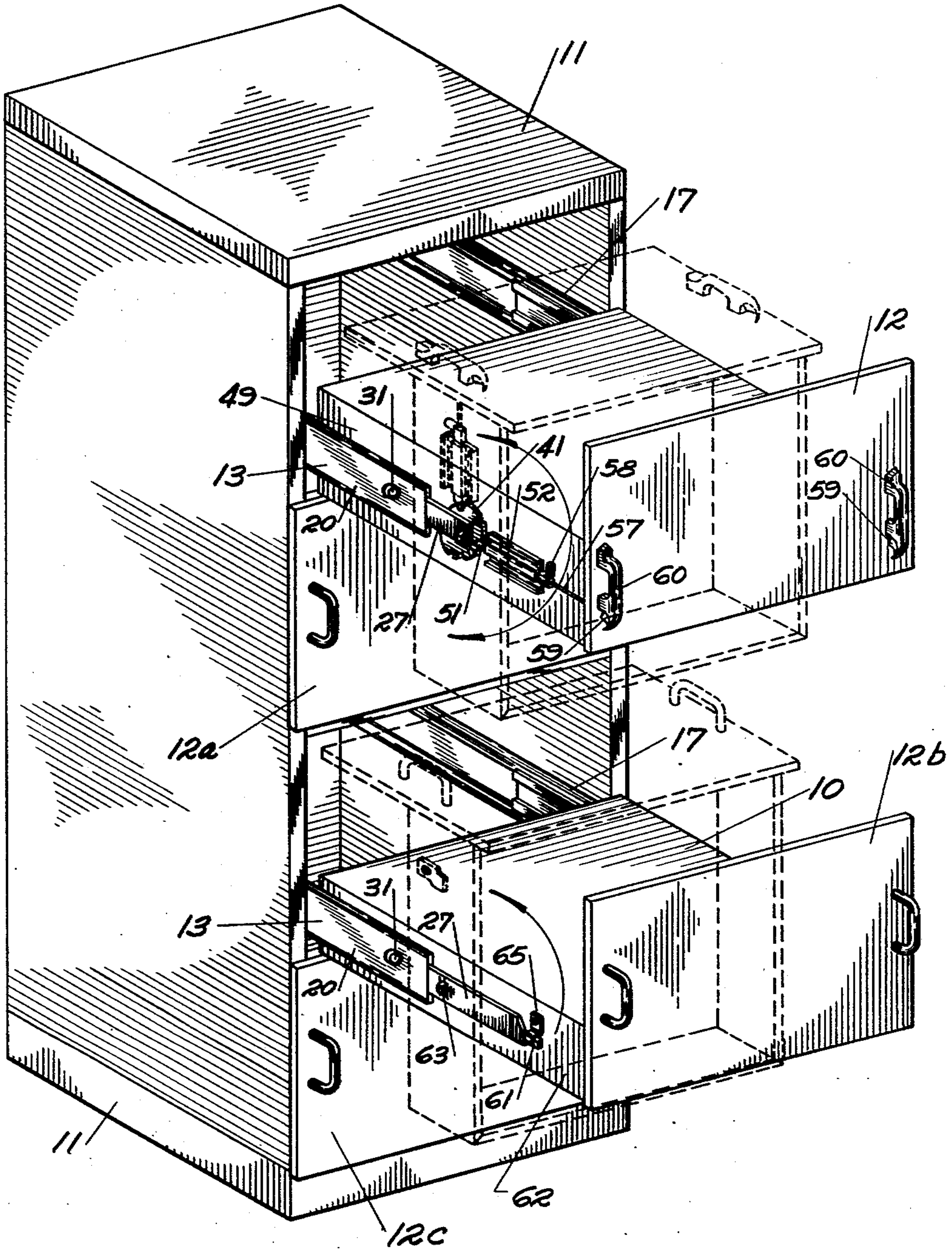
Fig. 1 is a view in front perspective of a structure to which the invention is applied.

The invention is herein illustrated, Fig. 1, as being applied to chassis 10, herein shown as four in number, one above the other, carried by a cabinet 11. Each of these chassis 10 has a front cover 12 which completely closes off the front side of the cabinet 11 when all of the chassis are pushed back into the cabinet so that these covers 12 become flush and in a common vertical plane in respect to their front sides. Thus there is the upper cover 12; the next lower cover **12*a*; the third cover 12*b*; and the bottom cover 12*c***.

Each chassis 10 is supported by a pair of tracks generally indicated by the numerals 13 and 17, Fig. 1, the tracks 13 and 17 being mounted at the same elevation, and horizontally disposed throughout their lengths extending within the cabinet 11. These tracks 13 and 17 are identical in construction with the exception that one is left hand and the other is right hand in construction. Therefore but one of the tracks needs to be described, and the description is directed to the track 13 which would be the left hand track in viewing the cabinet 11 from its front.

Referring to the track 13, there is an outer plate 14 generally rectangular in shape, and having an outturned mounting leg 15 at the forward end and a rearwardly extending tongue 16 also provided for mounting purposes. Both the leg 15 and the extension 16 are provided with suitable holes or slots to receive screws or bolts therethrough for attaching to the cabinet in any suitable manner as may be desired, such mounting not herein entering into the present invention. It is sufficient to indicate that the plate 14 is fixed in a horizontal, rigid position inside of the cabinet at the proper elevation.

The plate 14 has the upper and lower edge portions turned over and inwardly to form the upper and lower flanges 18 and 19 respectively, with rectilinear slots between the flanges and the plate 14.

Figure 3:
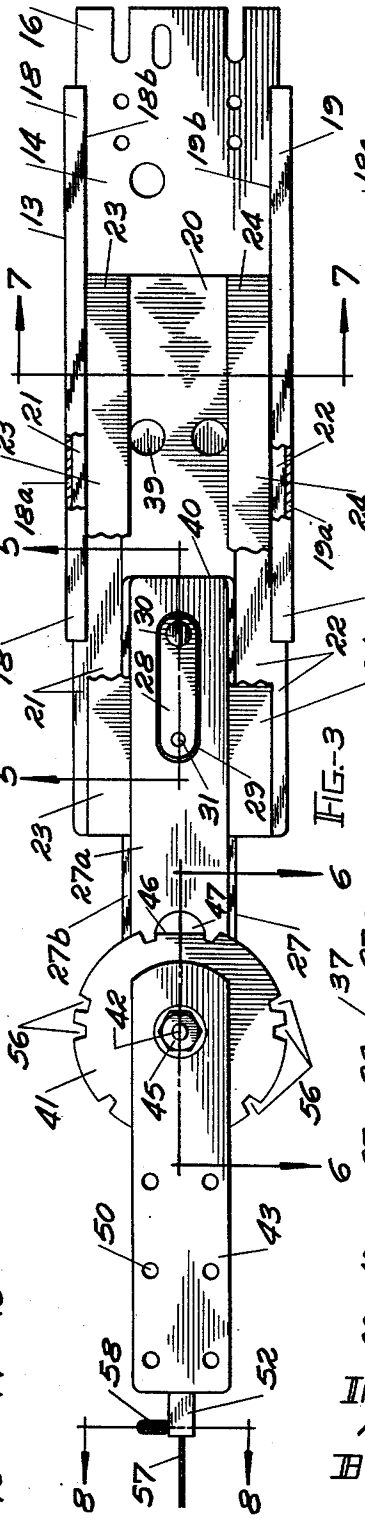
Fig. 3 is a view in inside elevation of the track.

An intermediate slide 20 is provided to fit against the inner face of the plate 14 and have its upper and lower marginal edges slidingly fitted to bear between the flanges 18 and 19 as indicated in Figs. 3 and 9, and riding on the webs 18*a* and 19*a* between the flanges 18 and 19 and the plate 14.

On the inner side of the intermediate slide 20 there are two slide bars 21 and 22 each fixed to and longitudinally of the inner face of the slide 20 in any suitable manner such as by welding, and these bars 21 and 22 are located in spaced apart relation vertically across the slides 20 to have the top edge of the bar 21 and the bottom edge of the bar 22 bear against the webs 18*a* and 19*a* of the flanges 18 and 19, and their exposed sides against the insides of the flanges. Thus, the slide 20 is held slidingly against the plate 14, and the bearing of the slide 20 on the webs 18*a* and 19*a* is increased by the thickness of the added bars 21 and 22, see Fig. 7.

On the exposed sides of the bars 21 and 22, there are welded thereto respectively the plates 23 and 24 to bear slidingly against the opposing edges 18*b* and 19*b* of the flanges 18 and 19. These members 23 and 24 further extend downwardly and upwardly respectively from the members 21 and 22 to form in effect therebetween a rabbet, the purpose for which will be apparent in the description to follow. The slide 20 is thus guided and supported primarily by the flanges 18 and 19 extending over the top and bottom edges of the slide 20 and terminating along the respective top and bottom edge of the plates 23 and 24.

The inner slide 27 is horizontally and slidably carried by the intermediate slide 20. In the present showing, this slide 27 is a two part member having an inner plate 27*a* and an outer plate 27*b*, the plate 27*b* being slidably carried between the overhanging portions of the members 23 and 24 and the intermediate plate 20, Fig. 3, while the inner plate 27*a* slidingly fits between the opposing edges of those members 23 and 24.

Figure 2:
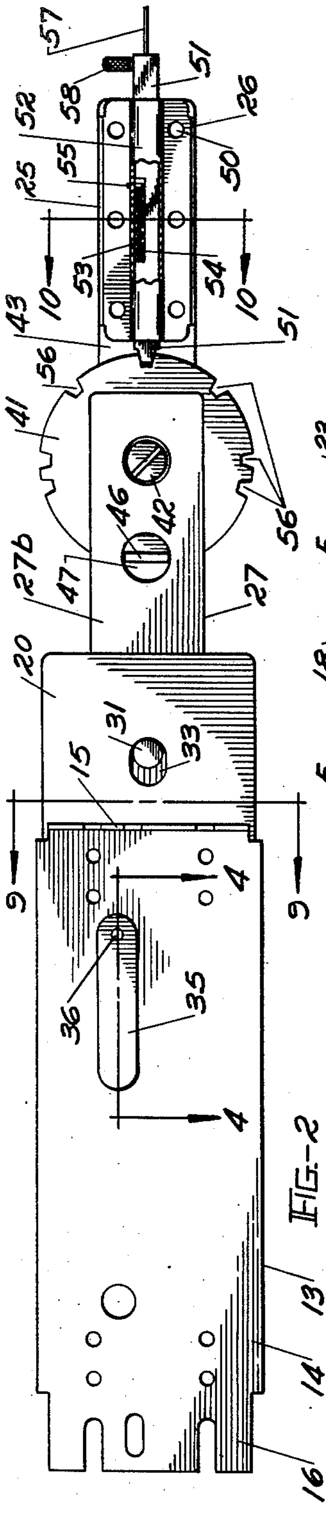
Fig. 2 is a view in outerside elevation of the track structure removed from the cabinet.
Figures 4, 5, 6, 7, 8:
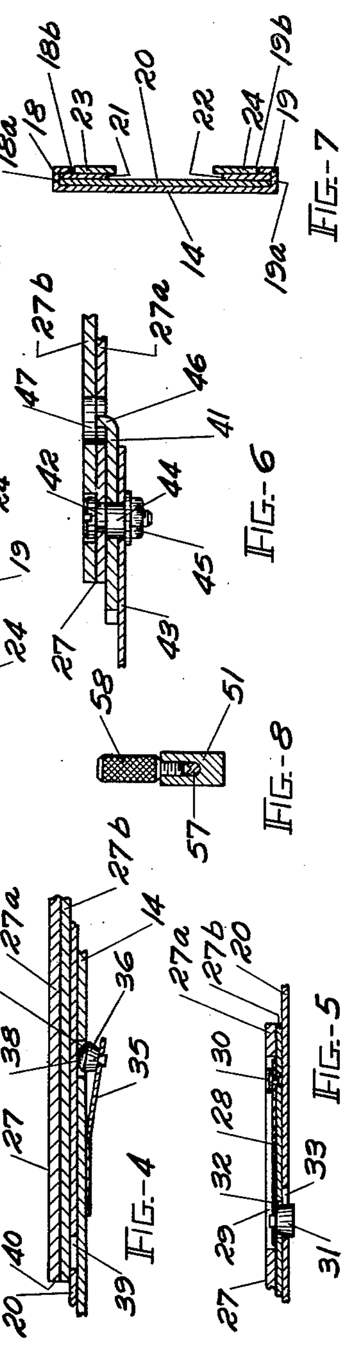
Fig. 4 is a view in horizontal section on the line 4—4 in Fig. 2.
Fig. 5 is a view in horizontal section on the line 5—5 in Fig. 3.
Fig. 6 is a view in horizontal section on the line 6—6 in Fig. 3.
Fig. 7 is a view in vertical section on the line 7—7 in Fig. 3.
Fig. 8 is a view in vertical section on the line 8—8, Fig. 3.

The inner slide 27 is normally secured against any appreciable horizontal longitudinal travel by means of a release latch consisting of a leaf spring 28 fixed to the plate 27*b* and fitting within an elongated slot 29 of the plate 27*a* and being fixed to the plate 27*b* at the forward end of the spring by means of a rivet 30, and having the other free end carrying a button 31 which is free to travel through a hole 32 provided in the plate 27*b*, and enter into a generally elliptical hole 33 in the intermediate plate 20, Figs. 2, 3 and 5. The button 31 is preferably made to be frusto-conical in shape with the base end projected outwardly through the hole 33, Figs. 2 and 5.

There is fixed by one end to the plate 14 a leaf spring 35, Figs. 2 and 4, this spring 35 carrying a button 36 on its free outwardly extending end to be yieldably carried through a hole 37 in the plate 14, this button 36 being of sufficient extension from the leaf spring 35 to extend normally through the plate and into the path of a hole 39 in the intermediate slide 20. The button 36 has a base portion frusto-conical of an altitude greater than the thickness of the plate 14, and on the outer end of the button 36 there is a rounded end portion 38.

The intermediate slide 20 hole 39 is in horizontal alignment with the button 36 whereby the button 36 will drop into the hole 39 upon sufficient outward travel of the intermediate slide 20, to have the round end 38 come into contact with the side of the plate 27*b* of the inner slide 27, Fig. 4.

When the inner slide 27 is pulled forwardly and the button 31 drops into the hole 33 of the intermediate slide 20, the rear end 40 of the slide 27 will have cleared the hole 39, and since the button 31 extends through the hole 33, additional forward pull on the slide 27 will carry the intermediate slide 20 along therewith until the hole 39 comes up to allow the button 36 to drop therethrough, the frusto-conical part extending slightly beyond the thickness of the intermediate slide 20 to have the slide 20 thus latched into fixed position with the plate 14 resisting further forward travel of the intermediate slide 20. The rounded portion 38 will extend inwardly beyond the intermediate slide 20 to have that rounded portion in the path of the end 40 of the inner slide 27 upon return travel so that as the end 40 overrides the rounded end 38, the button 36 will be cammed through the hole 39 allowing the slide 27 to travel relative to the intermediate slide 20, and furthermore to bring the frusto-conical portion of the button 36 outwardly from the hole 39 leaving the rounded end only therein, so that the slide 20 may also be pushed inwardly of the cabinet and thus by a cam action bring the button 36 back out to the position indicated in Fig. 4.

A detent wheel 41 is attached to the forward end of the inner slide 27 by means of an eccentric bolt 42 which extends through the inner slide 27, and the wheel 41, and a chassis mounting arm 43. The bolt 42 has an eccentric 44 confined to the thicknesses of the detent wheel 41 and the arm 43 so that the wheel 41 and the arm 43 may be shiftable in relation to the slide 27. The wheel 41 and the arm 43 may of course be secured in a fixed position by tightening the nut 45 on the end of the bolt 42. However an additional securing of the wheel 41 is provided by means of a lip 46 which is turned from the peripheral margin of the wheel 41 and extends into a hole 47 of the member 27*a* a distance, the wheel 41 being thus positively held against rotation.

The arm 43 is to be attached to the side of the chassis 49, Fig. 1, by any suitable means such as by rivets (not shown) inserted through the holes 50 to engage with the side wall of the chassis. Thus the chassis 49 is rockably carried through the arm 43 about the bolt 42 on which the arm 43 is releasably free to revolve as will be described.

On the outerside of the arm 43 a pawl 51 is horizontally and slidably guided through a housing 52, and is normally urged toward the periphery of the wheel 41 by means of a spring 53 carried in a slot 54 and bearing against a pin 55 fixed to the housing 52 and extending into the slot into the path of the spring. The pawl 51 may engage selectively in any one of the series of notches 56 provided in the wheel 41. Since the pawl 51 is carried by the arm 43, the arm 43 will be latched into any one of the selected positions determined by the notches 56 and by the pawl 51 entering the selected notch, and the pawl 51 may be released by pulling it horizontally or rather longitudinally of the arm 43 outwardly away from the wheel 41. This releasing travel is accomplished in one particular manner by means of a pull wire 57 secured to the outer end of the pawl 51 by means of a clamp screw 58, and this wire 57 is carried forwardly through the front cover 12 of the chassis 49 to a release member in the nature of a trigger 59 carried at the lower end of the handle 60 which is provided to be engaged in order to pull the chassis 49 outwardly to the position indicated in Fig. 1. The exact interconnection of the wire 57 to the member 59 may vary and does not enter into the gist of the invention, and the details thereof are not herein shown. All that is required in this instance is that the wire 57 be pulled forwardly in order to release the pawl 51 from the wheel 41 so that the entire chassis may be rocked either upwardly or downwardly as indicated by the dash lines in Fig. 1. Preferably the notches 56 are so located that the chassis may be rocked to an upper and rearwardly tilted position of 105 degrees in order to give easy access to the underside of the chassis 49; and downwardly through intermediate positions to at least a minus 90 degree position for full access to the upperside of the chassis.

Referring to Figs. 10 and 10*a*, the housing 52 extends upwardly and downwardly over the outside of the arm 43 and terminates in flanges 25 and 26 turned normally from the arm 43 at its respective top and bottom edges. These flanges are spaced apart to bear on the plates 23 and 24 when the slide 27 is retracted sufficiently along the plate 20 to afford load support of the chassis. The purpose of the eccentric bolt 42 is to align these flanges 25 and 26 with the edges of the plates 23 and 24.

Where it is not desired to rock the chassis downwardly or secure it in a fixed upwardly rocked position, the detent wheel 41 and the arm 43 may be omitted, and the slide 27 provided with a simple outwardly extending finger 61, Figs. 11 and 12. In this form, the chassis 62 for example, being the lowermost chassis in the cabinet 11 shown in Fig. 1, is rockably mounted between the two inner slides 27 by means of a bolt or screw 63 entering through selectively one of the holes 64, Figs. 11 and 12, and the side of the chassis is provided with a stop bracket 65 so that when the chassis is turned to the horizontal position, the bracket 65 will bear on the topside of the finger 61 in each instance. The chassis 62 is slightly overbalanced so that the chassis will normally remain in the horizontally disposed position with the bracket 65 bearing on the finger 61. In this form, the rocking of the chassis is limited to that degree of rocking from the horizontal position upwardly to the upper position as indicated by the dash line in Fig. 1.

In operating the device, referring to the upper drawer 12, Fig. 1, this drawer 12 is pulled outwardly, and in this forward travel under pull, such as by pulling on the handle 60, the inner slide 27 on each of the tracks 13 and 17 will slide forwardly in its guided relation with the intermediate slide 20, until the button 31 snaps into the hole 33, whereupon the intermediate slide 20 will also be pulled forwardly until the button 36 travels through the hole 39 to stop further forward travel. Then the pawls 51 may be pulled forwardly out of engagement with the notches 56 in the wheel 41, and the drawer 12 rocked downwardly or upwardly as may be desired, upwardly as indicated by the dash lines in Fig. 1, and upon release of the pawl 51, it will be urged into the notch 56 at the position selected. Work may then be done upon the underside of the chassis then presented forwardly of the cabinet. Then the pawls 51 may again be released to allow the drawer 12 to be rocked around to its horizontal position and then pushed inwardly of the cabinet. However the return pushing of the drawer 12 can not be fully occasioned until the buttons 31 are manually pushed inwardly of the holes 33 so as to release the inner slide 27 and allow it to travel relative to the intermediate slide 20. When the rear end 40 of the inner slide 27 comes into contact with the rounded end 38 of the button 36, that button 36 will be pushed to have its rounded portion 38 only presented in the hole 39, whereby the intermediate slide 20 may then be pushed back to cam the button 36 from the hole 39 and allow the rounded portion 38 to ride against the side of the slide 20 so as to permit the drawer 12 to be fully returned within the cabinet 11.

In the form shown as applied to the lowermost drawer **12*b*, Fig. 1, the drawer 12*b* will be pulled forwardly until the button 31 engages in the hole 33. Then the slide 20 will again be pulled forwardly to allow the button 36 to pass through the hole 39 and hold that intermediate slide 20 against further travel either forwardly or rearwardly, the slide 27 having uncovered the hole 39 as before described. Then the chassis 62 may be rocked upwardly into the vertical position as indicated, whereupon the underside of the chassis may be fully exposed for checking and work to be done thereon. This construction without the detent wheel as applied to the drawer 12*b* is quite useful in the lowermost drawers of a high tier of drawers since there is no particular occasion to rock the chassis 62** downwardly to expose its tube side in a substantially vertical plane. The drawer **12*b* may be returned to its closed position by pushing inwardly on the buttons 31 as before, whereupon the slides 27 may be pushed rearwardly relative to the intermediate slides 20 and then upon the slide 27 camming the buttons 36, the slide 20 may then take up rearward travel and permit the drawer 12*b*** to return to its closed position.

While I have herein shown and described my invention in the best form as now known to me, it is obvious that structural changes may be incorporated without departing from the spirit of the invention, and I therefore do not desire to be limited to that precise form beyond the limitations which may be imposed by the following claim.

I claim:

For conserving space and slidably supporting a chassis and the like in a cabinet, a thin wall track mounted in the cabinet on each side of the chassis, said track in each instance comprising a thin section plate having a longitudinal length approximately equal to the depth of the cabinet; means fixing the plate within the cabinet along a side thereof; upper and lower overturned flanges carried by said plate adjacent its longitudinal edges; said flanges being spaced apart with free edge portions directed one toward the other and extending longitudinally of the plate; an intermediate thin, plate-like slide riding by its edges on said flanges; an inner thin plate-like slide having tongues extending from its two longitudinal edges in planes parallel to the slide; said intermediate slide having opposing rabbets along its inner face receiving therein slidingly said inner slide tongues; means rockably mounting a side of said chassis on an outer end portion of said inner slide in each instance; means restraining the chassis at a predetermined degree of rocking between the inner slides; means manually releasably retaining said inner slides in forward positions of sliding along said intermediate slides; and a button carried by said plate yieldingly urged into the path of the intermediate and inner slides automatically engaging and disengaging said intermediate slide in a forwardly shifted position by travel of said inner slide to and from its forward retained position; a leaf spring mounted on said plate; said plate carried button being mounted on the free end of said leaf spring, the leaf spring having its free end directed in the direction of forward travel of said intermediate slide; said plate having an opening therethrough adjacent its forward end, into which opening said plate button is urged by said leaf spring to bear normally against said intermediate slide; said intermediate slide having an opening therethrough adjacent its rear end receiving said button therein upon forward travel of the intermediate slide, the button bearing against the said inner slide prior to that slide being in its said retained position; said button extending from its mounting spring a distance exceeding tne thicknesses of said plate and said intermediate slide allowing an end portion of the button to spring inwardly behind the rear end of said inner slide upon its being shifted to said retained position, thereby latching the intermediate slide against travel; said button having a latching length approximately equal to the combined thicknesses of said plate and said intermediate slide and an added cam length sufficient to urge the latching length out of said intermediate slide opening upon inward travel of said inner slide allowing the inner slide to slide thereover and place the cam length within said intermediate slide opening and finally allowing the intermediate slide to travel over and urge the cam length out of the intermediate slide opening.

References Cited in the file of this patent

UNITED STATES PATENTS

| | | |
|---|---|---|
| 1,071,006 | Little | Aug. 19, 1913 |
| 2,238,004 | Wolters | Apr. 8, 1941 |
| 2,655,422 | Gussack | Oct. 13, 1953 |